May 24, 1949.　　　　R. B. BOLTMAN　　　　2,470,801
TRACTOR TREAD
Filed Oct. 15, 1946
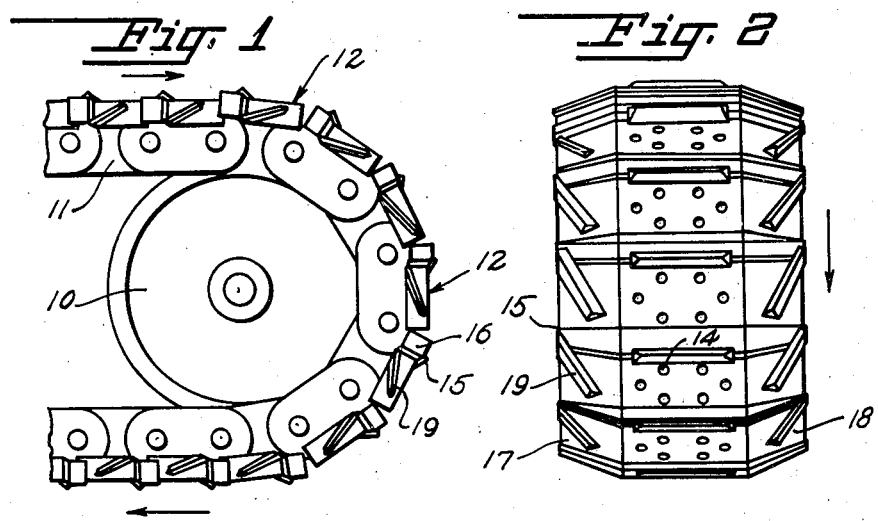
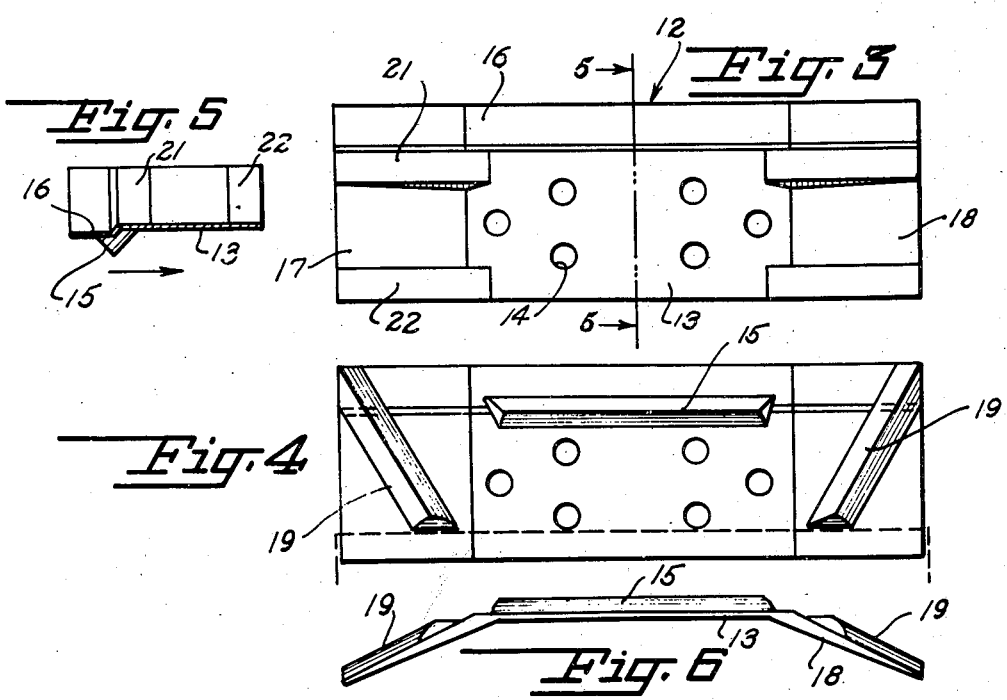
INVENTOR.
RALPH B. BOLTMAN Patented May 24, 1949

2,470,801

UNITED STATES PATENT OFFICE 2,470,801

TRACTOR TREAD

Ralph B. Boltman, Pittsburgh, Pa.

Application October 15, 1946, Serial No. 703,371

2 Claims. (Cl. 305—10)

This invention relates to tractor treads and more particularly to a tread which is adaptable for any ground condition.

It is the object of the present invention to provide a tractor with a tread whereby automatically as the tractor moves from hard ground into soft ground the additional gripping surface is supplied to the tread and whereby to make it unnecessary to change treads depending upon the use to which the tractor has been put.

It is another object of the invention to provide in a tread adapted for all conditions of the ground wherein there is disposed upon the lateral extensions which are inclined outwardly and upwardly adequate reinforcing means for the tractor tread at the location of these extensions.

It is another object of the invention to provide a gripping portion of the tread at the location where the tread is depressed and arranged for an overlapping connection with the preceding tread.

For other objects and for a better understanding of the invention, reference may be had to the following detailed description taken in connection with the accompanying drawings, in which Figure 1 is a side elevational view of a tractor crawler linkage with the tractor treads embodying the features of the present invention attached thereto.

Figure 2 is an end elevational view of the tread as viewed from the end thereof.

Figure 3 is a bottom plan view of one of the individual treads.

Figure 4 is a top plan view of one of the treads.

Figure 5 is a transverse cross sectional view taken on line 5—5 of Figure 3 and looking in the direction of the arrow thereof.

Figure 6 is a side elevational view of one of the treads.

Referring now to the figures, 10 represents a driving wheel over which is driven a tractor tread linkage 11. On this tractor tread linkage there is disposed the tread element 12 embodying the features of the present invention. This tread element 12 has a flat horizontal portion 13 with bolt holes 14 therein for attaching the tread to the tractor tread linkage 11. Upon this horizontal portion there is disposed a straight gripping projection 15 extending longitudinally of the tread and over a depression 16 in the bottom face of the tread. This depression 16 is to facilitate the overlapping of the treads as they are assembled upon the linkage. By having the treads overlap mud and other materials will not be squashed upwardly into the linkage. Normally this horizontal portion and the projection 15 would be suitable for hard ground but as the tractor is moved into an area where it is soft and muddy the horizontal portion of the tread is insufficient. Accordingly, I have provided upon the ends of the horizontal portion and extending laterally outwardly and upwardly therefrom wing portions 17 and 18. These wing portions have inclined gripping projections 19 thereon extending from a point adjacent the ends of the horizontal portion 13 diagonally upwardly and rearwardly to the upper rear corners of the wing portions 17 and 19. As the tread goes deeper into the mud automatically gripping projections will be added to the tread to give the added necessary traction which is required in the muddy or soft area.

In order that the wing portions 17 and 18 will be adequately reinforced to take their share of the load there is provided on the rear face of these portions reinforcing ribs 21 and 22. The reinforcing rib 21 is located adjacent to the recessed portion 16 whereas the reinforcing rib 22 is located flush with the opposite edge of the tread.

While various changes may be made in the detail construction it shall be understood that such changes shall be within the spirit and scope of the present invention as defined by the appended claims.

What I claim is:

1. A tractor tread element adapted to be secured to a tractor linkage, comprising a flat portion, a straight gripping projection on the outer face of the flat portion and extending longitudinally of the latter, an outwardly and upwardly extending wing portion projecting from each end of said flat portion and secured thereto, and a gripping projection on the outer face of each of said wing portions, the gripping projection on each of said wing portions being arranged so that it extends diagonally with respect to the projection on said flat portion.

2. A tractor tread element adapted to be secured to a tractor linkage, comprising a flat portion, a straight gripping projection on the outer face of the flat portion and extending longitudinally of the latter, an outwardly and upwardly extending wing portion projecting from each end of said flat portion and secured thereto, a gripping projection on each outer face of each of said wing portions, the gripping projection on each of said wing portions being arranged so that it extends diagonally with respect to the projection on said flat portion, and a plurality of ribs secured to the inner face of said flat portions and wing portions for re-inforcing the latter.

RALPH B. BOLTMAN.

REFERENCES CITED

The following references are of record in the file of this patent:

UNITED STATES PATENTS

| Number | Name | Date |
|---|---|---|
| 1,261,827 | McCollum | Apr. 9, 1918 |
| 1,304,357 | Norelius | May 20, 1919 |
| 1,630,089 | Leake | May 24, 1927 |